Patented Dec. 9, 2,432,113

UNITED STATES PATENT OFFICE 2,432,113

METHOD OF IMPREGNATING A POLYVINYL POLARIZING SHEET WITH TETRAETHYL ORTHO SILICATE

Alvin Marks, Beechhurst, Gerhart Weiss, Sunnyside, Long Island, and Alvin Robert Miller, Forest Hills, N. Y.; said Weiss and said Miller assignors to said Marks No Drawing. Application April 21, 1942, Serial No. 439,954

1 Claim. (Cl. 88—65)

Our invention relates to a novel process for protecting a polarizing sheet and the product produced thereby, and more particularly our process relates to treating a polarizing sheet with a silicate, such as ethyl silicate, and causing the impregnation or coating of the polarizing element with a silica compound, thus protecting the polarizing element against deterioration and/or injury.

In the copending application, Serial No. 425,064, of Alvin Marks, there is described the method for the manufacture of a polarizing element by stretching a sheet of polyvinyl butyral and intensifying this stretched sheet of polyvinyl butyral with an iodine compound so as to obtain a polarizing element having a crystalline polarizing surface. We have found it desirable to protect this polarizing element against the action of heat and light to prevent the deterioration of the polarizer.

It is the object of the present invention therefore to so treat the above described polarizing element to prevent its deterioration under the action of heat and/or light.

It is a further object of the present invention to protect the polarizing element described against the misalignment by retraction under the influence of elevated temperatures.

It is a further object of the present invention to provide an effective barrier for the polarizing element to retard the migration outwardly of constituents of the element or to prevent the penetration inwardly of any solvent plasticizer or other injurious material.

These objects we accomplish by a variety of particular methods which may be generally described as the treatment of the polarizing element with a silicate such as tetra ethyl ortho silicate and reacting the silicate in situ in the polyvinyl butyral to form what we believe to be a condensation or linkage between the silicate and the polyvinyl butyral. By certain heat treatments which will be specifically set out hereinafter we effect the further stabilization of the so treated polarized element.

In the copending application of Alvin Marks referred to above, the method for the manufacture of a polarizing element comprises stretching a sheet of polyvinyl butyral and treating this stretched sheet with an iodine compound. By stretching the polyvinyl butyral there is formed a continuous lattice structure comprising polyvinyl chains with butyral side chain linkages. We believe that the structure can be visioned as a continuous open lattice work which provides a base field upon which the ionic iodine units attach themselves in ordered arrays. Thus, there is formed an electrical grid which acts upon transmitted electromagnetic light radiation, absorbing and thereby blocking light vibrations parallel to one direction of the grid and transmitting freely vibrations at right angles to the absorbing direction of the grid. It is also likely that the distances between the arrays of ionic iodine units constituting the grid are such as to absorb light radiation between the red and the violet, thus being capable of polarizing the entire visible transmitted spectrum. This is evidenced by the neutral color of the white light transmitted through a suitably constructed polarizer of this type. The plane of the freely transmitted electric vector of the light is at right angles to the direction of stretch.

Although polarizers so formed have had good polarizing characteristics, they are susceptible to heat, light and solvents and deteriorate under these influences. Specifically, loss of polarization properties and retraction result.

We have found that it is possible to introduce the silicate into the open spaces of the lattice structures and to cause a reaction to occur between the silicate compound and the components of the polyvinyl butyral chain which constitute part of the lattice structure. This causes the silica to link to or to intercondense with the polyvinyl butyral lattice structure, making the silica a part of the lattice structure in such a manner that the silica substantially fills the open spaces in the lattice structure. By subsequently treating this structure to eliminate volatile by-products and the penetrants employed, the structure is solidified resulting in (1) prevention of retraction of the film and (2) hardening of the surface which stabilizes the arrays of ionic iodine, thus providing a product which is not retractive and which is stable to heat and light.

The silica treatment, by hardening the surface of the polarizing element further protects the element against wear or scratching and renders the surface substantially insoluble to all ordinary solvents.

By means of a two stage heat treatment, first for a relatively long period at a low temperature and secondly for a relatively short period at a high temperature, the impregnated silica is caused to become substantially rigid and non-porous.

Inasmuch as we have found that there is a certain loss of polarization properties because of the heating and the solvent action, we have found it desirable in certain instances to compensate for this loss by reintensifying the polarizing element to build up or strengthen the polarization characteristics of the element. The intensification solution used may be that set forth hereinafter and which is referred to in the Marks application Serial No. 425,064.

In introducing the ethyl silicate into the polyvinyl butyral structure we prefer to use mixtures of ethyl silicate and ethylene dichloride. Since polyvinyl butyral is substantially insoluble in ethyl silicate, the ethyl silicate has only a slight penetrating action on the surface of the polyvinyl butyral. However, by employing a penetrant such as ethylene dichloride, we can cause the silicate to enter into or penetrate the polyvinyl butyral lattice structure, the penetrant causing the polyvinyl butyral lattice structure to swell rendering it receptive to the silicate. These penetrants as used herein however have substantially no solvent action nor do they have a material deteriorating action upon the polarizing structure.

Thus, we prefer to intermix ethyl silicate with a suitable penetrant such as ethylene dichloride. The ethylene dichloride and the ethyl silicate then enter into the polyvinyl butyral polarizing lattice. It is likely that a reaction occurs between the OH groups of the polyvinyl chain and the ethyl radical of the ethyl silicate with the elimination of ethyl alcohol and the simultaneous condensation or linkage of the silica and the polyvinyl butyral.

We have found it essential to effect the elimination of the ethyl alcohol reaction product and the surplus ethylene dichloride penetrant after the treatment in order to obtain the hardening and antiretraction effects together with the greater stability desired. This elimination is effected by drying out with or without heat, preferably while the film is under tension until the hardening is adequate to prevent retraction or warping.

The film so treated will not retract under exposure to a temperature of 100° C. nor will its polarizing action be substantially decreased under such treatment.

Moreover, whereas the original polyvinyl butyral—iodine polarizer upon exposure to ethyl alcohol is immediately attacked and dissolved and its polarizing action destroyed by a surface dissolution, a polarizing element treated according to the present invention will remain substantially unaffected for periods of 10 minutes upon immersion in alcohol, thus showing a very substantial increase in the insolubility of the film.

The treatment of the polarizing element with a mixture of ethyl silicate and ethylene dichloride also results in an extraction and color neutralizing action when a solution containing 25–40% ethylene dichloride is employed. (With less than 20% ethylene dichloride no extraction action takes places.) The polarizing polyvinyl butyral film utilized herein having been prepared as described in the above-mentioned Marks application has a light blue-green coloration. After exposure to a solution of 40% ethylene dichloride—60% ethyl silicate mixture, the light blue-green color disappears in approximately from two to three minutes and the resulting film is substantially color neutral. Subsequently if the proper heating cycle is maintained as described hereinafter, the color neutrality and polarizing properties are enhanced provided that the heating is not carried to excess.

The ethyl silicate can be impregnated into the polyvinyl butyral polarizing element either by a separate dip as generally described above or by adding ethyl silicate to the intensification solution used to intensify the polarizing element as described in the copending Marks application.

In lieu of using ethylene dichloride as a penetrant, we may use alcohol.

Specifically, the processes of our invention are as follows:

According to one form of our invention we take a polarizing element comprising a stretched, iodine intensified and extracted polyvinyl butyral, which polarizing element has an aligned crystalline lattice polarizing surface that is porous to a certain degree. This polarizing element we dip in ethyl silicate to which has been added 5% of 3A alcohol. 3A alcohol is alcohol containing 100 parts by weight of 95% ethyl alcohol to which is added 5 parts by weight of methyl alcohol.

The alcohol facilitates the penetration of the silicate into the somewhat porous crystalline lattice work, the result being that the ethyl silicate can penetrate into and settle into the pores of the porous polarizing crystalline lattice work. The polarizing element is dipped in the ethyl silicate—alcohol solution for a period of 12 hours to obtain thorough penetration thereof. After this is done the film is rubbery and this thoroughly impregnated film is then dipped in an acid solution to effect the reaction of the ethyl silicate with the polyvinyl compound. The acid may, for example, be a weak aqueous solution of hydrochloric acid on the order of 3–5%.

The reaction effects a condensation between the ethyl silicate and the polyvinyl butyral with the formation and elimination of ethyl alcohol. There appears to be a definite linkage between the silicate and the polyvinyl butyral. The silica product produced by the reaction is retained within the pores of the polarizing element.

Alternatively to employing a separate acid dip, reaction is effected by adding small proportions such as 3–5% of hydrochloric acid or 3–10% of HI directly to the ethyl silicate whereupon the reaction is effected during the dipping. In this case a coating over the film of transparent silica is formed, which subsequently can be solidified by heating to a transparent protective silica coating.

The silicate treated polyvinyl butyral polarizing element formed by this method is very stable.

According to the preferred form of our invention, we employ ethylene dichloride in lieu of alcohol for penetration. We have found that we obtain superior penetration without deleterious effects by employing a dipping bath comprising 60 parts of ethyl silicate and 40 parts of ethylene dichloride. The ethylene dichloride employed as a penetrant is superior to the alcohol because when sufficient alcohol is used to obtain good penetration it has a certain solvent action on the polarizing element.

The ethylene dichloride effects the penetration of the silicate into the crystalline lattice without any substantial dissolving action on the polarizing element. After the polyvinyl butyral polarizing element is dipped in the ethyl silicate—ethylene dichloride solution, the coated and impregnated polyvinyl butyral polarizing element is dipped in a two per cent solution of HCl in water saturated with ethylene dichloride to effect the condensation between the polyvinyl butyral and the silicate.

The silica compound may also be formed within the polyvinyl butyral lattice structure without the use of an acid dip. When the use of the acid is eliminated the reaction proceeds at a slower rate and time must be allowed for this reaction.

Polyvinyl butyral polarizing film prepared as set forth in the Marks application above referred to having a final thickness of approximately .006 inch may be dipped in the following solutions maintained at 20° C. for the maximum time periods set forth before retraction.

| Ethyl silicate, per cent by Volume | Ethylene dichloride, per cent by Volume | Maximum time free film can be dipped before retraction |
|---|---|---|
| | | Min. |
| 75 | 25 | 13 |
| 70 | 30 | 11 |
| 65 | 35 | 7 |
| 60 | 40 | 5 |

In order to get thorough silicate impregnation it may be desirable that the films be dipped for longer periods than those set forth in the examples listed. Long dipping can be employed if the films are maintained in a stretched or extended condition during the dipping.

It is desirable to remove any excess ethyl silicate or ethylene dichloride from the surface of the film after the dipping and this can be done by the use of a liquid that is non-solvent for the polarizing element but which is a solvent for the ethylene dichloride and the ethyl silicate. Such liquid is for example isopropyl ether.

After this treatment the films are dried overnight, the dried films showing a very high lustre and a resistance to the action of alcohol or other solvents.

It appears that the silica which is fixed in the form of a condensation or linked product in the crystallized polyvinyl polarizing surface of the polarizing element, blocks the surface against the penetration of solvents and therefore physically protects the polarizer. The condensation or linkage product which appears to be formed between the polyvinyl compound and the silicate is substantially an inert compound with respect to the influences to which this polarizing element is subject. Its resistant action is therefore that of physical blocking and chemical inertness.

The presence of the silicate or the condensation product in the pores of the lattice structure of the crystallized polyvinyl compound also prevents the retraction of this stretched or extended polyvinyl sheet under the influence of heat. This is because the silicate linkage or condensation product has a certain stiffness or hardness and thereby physically prevents the structure from collapsing or shrinking.

A theory of the mechanics of the linkage of the silicate with the polyvinyl butyral is set forth diagrammatically herein. The reaction which takes place between two free (OH) groups of a polyvinyl compound and the ethyl silicate is believed to be as follows:

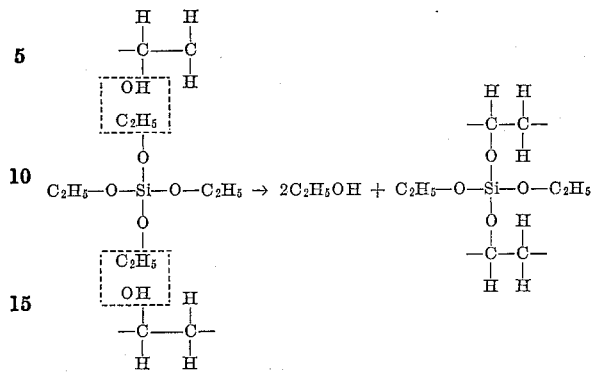

Because of its structure it tends to act as a buttress in maintaining the spaced position of the oxygen atoms and therefore accounts for the physical reinforcement and prevention of retraction that actually occurs. It actually does act to fill up or block the interstices and brace the lattice structure.

The iodine ions being negatively charged are believed to be arranged between the OH and H positions of the polyvinyl butyral chain.

We have found it possible to increase the stability of the polarizing element by subjecting the silica impregnated polarizing element formed as described above, in stretched or extended condition, to a temperature of 100–140° F. for a period on the order of 10 hours, followed by a heating for a period on the order of four hours at a temperature of 200–250° F. The so treated polarizing element will be found to resist retraction even at a temperature as high as 212° F. and is quite stable under ultra violet light or heat. Its polarizing properties are excellent.

This heat treatment dries out any residual solvent in the polarizing element and thus prevents any attack on the polarizing element by such residual solvent.

Various two stage heating steps may be employed to remove any residual solvent from the film and render it impervious to external solvent influences. For example a silica impregnated polarizing element having excellent resistance to alcohol can be produced by dipping the polyvinyl butyral polarizing element in a solution containing 25–30% ethylene dichloride for periods ranging from nine and one-half to twelve minutes and subsequently heating in the range of from 20 hours at 35° C. to 25 hours at 55° C., or the preliminary heating may be for 20 hours at 35° C. followed by a final heating at 85–100° C. for from 2 to 4 hours. The film should be maintained under tension during this heating.

The dipping of the polarizing element in the ethylene dichloride, ethyl silicate solution causes a certain loss of polarization properties and we have found that if the final heating at high temperature is slightly foreshortened that the silicate impregnated polarizing film can be reintensified by subjecting it to an intensification solution containing:

*Intensification solution*

| | Cc. |
|---|---|
| H₂O distilled | 751 |
| Normal propyl alcohol | 85 |
| Iodine—normal propyl alcohol solution (0.167 gram of iodine per cc.) | 55 |
| HI, 47% hydroiodic acid | 5 |

The intensification solution does not dissolve the silicate impregnated polarizing element but peculiarly the iodine which is the active element of the intensification solution migrates into the silicate impregnated polarizing element and strengthens its polarization properties. A more neutral color is obtained thereby.

Further heating is optional since the product is quite satisfactory as such being substantially impermeable to solvent attack and retraction proof.

The final high heating described, in addition to driving out any residual solvent, also hardens the silica to increase the retraction proof properties of the polarizing element and increases its resistance to solvent penetration.

Alternatively to the process described hereinabove, we have found that we can effect the silica impregnation of the polarizing element by adding ethyl silicate directly to the intensification solution. Thus, the silica impregnation may be effected by adding 10 parts by volume of tetra ethyl ortho silicate to 100 parts by volume of the intensification solution set forth above. The ethyl silicate then enters into the polarizing element at the same time that the polarization element is intensified in the iodine solution. The ethyl silicate reacts and forms a reaction compound with the polyvinyl butyral. The alcohol content of the intensification solution acts as a penetrant and assists in the penetration by the ethyl silicate.

The combination of the ethyl silicate and intensification solution is quite stable for a considerable period of time and it appears likely that the reaction or addition complex is formed between the constituents of this solution.

Thus we have found that both the intensification solution and ethyl silicate penetrate into the surface of the polyvinyl butyral lattice and intensifies the same and at the same time improves the stability of the resulting product with regard to the action of light, heat and solvent.

We have found it advantageous to add to the intensification solution a sulfonated alcohol either for the purpose of improving the intensification of the polarizing element or, when ethyl silicate has been added to the intensification solution, for improving the impregnation of the polarizing element with ethyl silicate.

The sulfonated alcohol assists in the wetting of the polyvinyl butyral polarizing element and we have found that a more uniform and more effective intensification is effected when a small proportion, say for example 1 to 2% of the sulfonated alcohol, is added to the intensification solution. The sulfonated alcohol is also effective when ethyl silicate has been added to the intensification solution to assist in the impregnation of the polarizing element with ethyl silicate.

The method of the present invention is particularly valuable for producing polarizing elements of curved or toric shape. In this process we impregnate a planular polarizing element with the silicate and suitably shape it to curved form. While the silica impregnated element is being shaped the condensation reaction occurs between the silicate and the polyvinyl compound causing stiffening or setting of the now curved element. The reaction can be effected by the addition of a weak acid solution as set forth above or by the use of heat alone. When so set the curved polarizing element is protected as described above and permanently retains its shape for use per se or for lamination between lenses.

It is within the purview of our invention to employ the silica impregnated or silica impregnated and coated polarizing element either per se by planishing the same between smooth surfaces under heat and pressure, to provide a smooth flat resistant coating thereof, or the so treated polarizing element may be laminated between glass or plastic sheetings by means of suitable adhesives.

As the silicate, we prefer to employ tetra ethyl ortho silicate but other silicates may be employed. In lieu of the preferred ethylene dichloride and the workable alcohol penetrants, other agents suitable for effecting penetration in the polarizing element may be used.

Various other modifications of our invention will suggest themselves to those skilled in the art. We accordingly desire that in construing the breadth of the appended claim, they shall not be limited to the specific details shown and described in connection with the above explanation.

We claim:

The method of protecting a polarizing element which comprises impregnating the surface of a polarizing element comprising a polyvinyl compound which has been stretched and treated with an iodine compound with tetraethyl ortho silicate, and heating to effect a reaction between the tetraethyl ortho silicate and the polyvinyl compound to form a polyvinyl-silicate condensation product that prevents retraction of the polarizing element.

ALVIN MARKS.
GERHART WEISS.
ALVIN ROBERT MILLER.

REFERENCES CITED

The following references are of record in the file of this patent:

UNITED STATES PATENTS

| Number | Name | Date |
|---|---|---|
| 2,027,931 | Ray | Jan. 14, 1936 |
| 2,230,369 | Wise | Feb. 4, 1941 |
| 2,328,219 | Land | Aug. 31, 1943 |
| 2,327,872 | Dahle | Aug. 24, 1943 |
| 2,199,227 | Marks | Apr. 30, 1940 |
| 2,237,567 | Land | Apr. 8, 1941 |
| 2,236,972 | Kasemann | Apr. 1, 1941 |
| 2,104,949 | Marks | Jan. 11, 1938 |
| 2,256,108 | Blake | Sept. 16, 1941 |
| 2,317,891 | Dennison | Apr. 27, 1943 |
| 2,213,643 | Alton | Sept. 3, 1940 |
| 2,215,048 | McGregor et al. | Sept. 17, 1940 |
| 2,132,268 | Mallard | Oct. 4, 1938 |
| 1,919,766 | Beal | July 25, 1933 |
| 52,906 | Taylor | Feb. 27, 1866 |
| 2,168,220 | Land | Aug. 1, 1939 |
| 2,173,304 | Land et al. | Sept. 19, 1939 |

FOREIGN PATENTS

| Number | Country | Date |
|---|---|---|
| 526,780 | Great Britain | Sept. 25, 1940 |
| 540,940 | Great Britain | Nov. 6, 1941 |